United States Patent
Vandermersch (10) Patent No.: US 7,349,352 B2
(45) Date of Patent: Mar. 25, 2008

(54) METHOD FOR HANDLING LARGER NUMBER OF PEOPLE PER CONFERENCE IN VOICE CONFERENCING OVER PACKETIZED NETWORKS

(75) Inventor: Philippe Vandermersch, San Jose, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 916 days.

(21) Appl. No.: 10/056,776

(22) Filed: Jan. 24, 2002

(65) Prior Publication Data

US 2003/0063573 A1 Apr. 3, 2003

Related U.S. Application Data

(63) Continuation-in-part of application No. 09/965,375, filed on Sep. 26, 2001.

(51) Int. Cl.
*H04L 12/16* (2006.01)
*H04L 12/66* (2006.01)

(52) U.S. Cl. ........................ 370/261; 370/352
(58) Field of Classification Search .................. None
See application file for complete search history.

(56) References Cited

U.S. PATENT DOCUMENTS

| | | | | |
|---|---|---|---|---|
| 5,384,772 | A * | 1/1995 | Marshall | 370/235 |
| 5,936,662 | A * | 8/1999 | Kim et al. | 348/14.09 |
| 5,963,547 | A | 10/1999 | O'Neil et al. | |
| 6,438,123 | B1 * | 8/2002 | Chapman | 370/351 |
| 6,452,950 | B1 * | 9/2002 | Ohlsson et al. | 370/516 |
| 6,466,550 | B1 * | 10/2002 | Foster et al. | 370/261 |
| 6,671,262 | B1 * | 12/2003 | Kung et al. | 370/260 |
| 6,687,752 | B1 * | 2/2004 | Falco et al. | 709/230 |
| 6,704,311 | B1 * | 3/2004 | Chuah et al. | 370/389 |
| 6,721,333 | B1 * | 4/2004 | Milton et al. | 370/469 |
| 6,804,237 | B1 * | 10/2004 | Luo et al. | 370/392 |
| 6,847,618 | B2 * | 1/2005 | Laursen et al. | 370/261 |
| 6,940,826 | B1 * | 9/2005 | Simard et al. | 370/260 |
| 6,993,021 | B1 * | 1/2006 | Chuah et al. | 370/389 |
| 2002/0003779 | A1 * | 1/2002 | Szabo | 370/252 |

FOREIGN PATENT DOCUMENTS

| | | |
|---|---|---|
| EP | 0 888 029 A2 | 12/1998 |
| EP | 1 039 734 A2 | 9/2000 |
| WO | WO 00/72560 A1 | 11/2000 |

OTHER PUBLICATIONS

Keiko Tanigawa, Simple RTP Multiplexing Transfer Methods for VoIP, 1998, Internet Draft, pp. 1-11.□□*
H. Schulzrinne, RTP: A Transport Protocol for Real-Time Applications, 1996, Audio-Video Transport Working Group, pp. 1-75.*

* cited by examiner

*Primary Examiner*—Steven Nguyen (57) ABSTRACT

The present invention is directed to a system and method for handling larger number of people per conference in voice conferencing over packetized networks. A method for providing a conferencing session may include receiving inputs from a number of participants in a conferencing session. The received inputs are combined into an output packet including at least two sub-packets. The sub-packets having payloads including mixed received inputs from the number of participants. The payloads of at least two of the sub-packets contain different mixed received inputs.

18 Claims, 9 Drawing Sheets

METHOD FOR HANDLING LARGER NUMBER OF PEOPLE PER CONFERENCE IN VOICE CONFERENCING OVER PACKETIZED NETWORKS

CROSS REFERENCE TO RELATED APPLICATIONS

The present application claims priority under 35 U.S.C. §120 as a continuation-in-part of U.S. patent application Ser. No. 09/965,375, filed on Sep. 26, 2001, titled "Method for Background Noise and Reduction and Performance Improvement in Voice Conferencing Over Packetized Networks," which is herein incorporated by reference in its entirety.

BACKGROUND OF THE INVENTION

The present invention relates generally to data transfer and particularly, to a method for handling a larger number of people per conference in voice conferencing over packetized networks.

Conference calling, such as a conference by telephone and other like audio and/or visual device in which three or more persons in different locations participate by means of a central switching unit, enables participants in widely dispersed geographical areas to communicate in an efficient manner in real time. Because of the great utility provided by conference calls, the use of this method of communication has made its way into many aspects of modern life, connecting home users, wireless users, business personnel, and the like, to enable multiple users the ability to communicate with each other at the same time. In this way, a group of people may communicate directly without requiring the participants to physically travel to the same location. However, a conference call may encounter a large quantity of background noise thereby reducing the quality and utility of the conference call.

Therefore, when mixing voice streams from multiple participants in a conference call, it is desirable to reduce background noise within the conference call as well as reduce computational resource requirements required in providing the call. Previous methods utilized to correct for background noise involved outputting to each participant the gain corrected sum of all voices, outputting to each participant the gain corrected sum of the voices of all other participants, and outputting only the loudest speaker to each participant.

While outputting to each participant the gain corrected sum of all voices may be acceptable in circuit switched networks, in which delays are low and participants can not hear their own voice due to compensation by the human communication channel and brain of the participant, such a method is not feasible in a packetized network. For instance, in an environment where voice is transported over a packet network, the delay may be larger, so that participants may be able to hear their own voice, recognized as a disturbing echo. Such an echo is typically too strong to be removed utilizing normal echo cancellation, and further, requires extensive resources, as such removal may be computationally expensive as the echo tail may be quite long, such as greater than 60-160 milliseconds (ms).

Outputting to each participant the gain corrected sum of the voices of all other participants adds, in addition to the voice of active participants, background noise for "silent" participants. Thus, as the number of participants increase, the background noise from "silent" participants also increases, thereby lowering the quality of the communication. Additionally, this technique is computationally expensive, since it may be necessary to perform a time add of (n-1) voices for each participant, n being the number of participants.

Further, outputting only the loudest speaker to each participant generally suffers from insufficient voice quality. For example, in conference calls with high interactivity, switchovers between participants may be disturbing to the participants. During a switchover between loudest participants, information from one participant may be lost, thereby affecting the continuity of the call and the overall experience. Moreover, situations may be encountered within the call in which more than one speaker may wish to speak at the same time. In such a situation, one of the inputs would not be provided to the other participants, and the originating participant may not even know if the output was transmitted.

Other techniques previously employed were insufficient due to a variety of reasons. In a Voice Over IP system that does not employ a multipoint control unit, each endpoint sent, in multicast, the data from that endpoint to other endpoints. Thus, each endpoint received several voice streams and had to mix them. This resulted in limitations in the number of people due to computation constraints, such as limiting the number of participants to 3 or 4. In a Voice Over IP system with a multipoint control unit, each participant had their voice stream sent to the multipoint control unit. The voices of the participants were then mixed, and the result sent individually to each participant in the conference. This technique rapidly saturates the network and significantly loads the IP stack in the multipoint conference unit. For instance, the multipoint conference unit may have to send the result of the mixing separately to each participant, thereby limiting the size of the conference. An additional solution to provide very large conferences involves only allowing one person to speak, thereby limiting the other participants to only listening to the content, in effect working as a broadcast rather than a conference.

SUMMARY OF THE INVENTION

According to a specific embodiment, the present invention provides a method for providing a conferencing session includes receiving inputs from a number of participants in a conferencing session. The received inputs are combined into an output packet including a first sub-packet and a second sub-packet, wherein the first sub-packet has a first payload and the second sub-packet has a second payload. The first payload and the second payload include inputs combined from at least a portion of the received inputs from the number of participants, wherein the first payload includes at least one received input that is not included in the second sub-packet.

According to another specific embodiment, the present invention provides a method for providing a conferencing session includes receiving inputs from a number of participants in a conferencing session. The received inputs are combined into an output packet including at least two sub-packets. The sub-packets having payloads including mixed received inputs from the number of participants. The payloads of at least two of the sub-packets contain different mixed received inputs.

According to another specific embodiment, the present invention provides a conferencing system suitable for providing a conferencing session to a plurality of participants includes a multipoint control unit communicatively coupled over a packetized connection to a plurality of input/output devices utilized by a number of participants to enable the participants of a conferencing session to interact. The multipoint control unit is configured to receive inputs from the input/output devices in a conferencing session and combined received inputs into an output packet including a first sub-packet and a second sub-packet. The first sub-packet has a first payload and the second sub-packet has a second payload, the first payload and the second payload including inputs combined from at least a portion of the received inputs from the number of participants. The first payload includes at least one received input that is not included in the second sub-packet.

It is to be understood that both the foregoing general description and the following detailed description are exemplary and explanatory only and are not necessarily restrictive of the invention claimed. The accompanying drawings, which are incorporated in and constitute a part of the specification, illustrate an embodiment of the invention and together with the general description, serve to explain the principles of the invention.

DETAILED DESCRIPTION OF THE INVENTION

The present invention is directed to a method for providing a solution to handle large conferences in a voice over IP network. The present invention significantly reduces the number of packets sent over a network and consequently offloads a protocol stack of a multipoint control unit (MCU). Whatever the number of people participating in the conference, the number of packets sent by the multipoint control unit is low and constant per conference. Additionally, the invention significantly reduces the global amount of data sent over the network to perform a large conference.

Reference will now be made in detail to the presently preferred embodiments of the invention, examples of which are illustrated in the accompanying drawings.

Referring generally now to FIGS. 1 through 9, exemplary embodiments of the present invention are shown. The present invention provides a comprehensive solution for voice media mixing in conferences over packetized networks. For example, the present invention may combine a minimal number of RTP streams with the same timestamp, but with different payloads, in the same UDP stream in order to reduce overhead and avoid synchronization issues. Additionally, the present invention may utilize a contributing sources (CSRC) indicator in the RTP packet to enable an endpoint to select the correct packet to output. In this way, the total number of packets sent over the network to perform a conference is significantly reduced, and the total amount of data sent over the network to perform a conference is significantly reduced. Additionally, the network load due to the mixing output may be constant regardless of the number of people in the conference, thereby enabling the number of people in the conference to grow dynamically without affecting the network load. Further, the computing power for a multipoint control unit (MCU) to encode the mixed voice is dramatically reduced in cases in which CPU-intensive low bit-rate voice codecs are employed.

Figure 1:
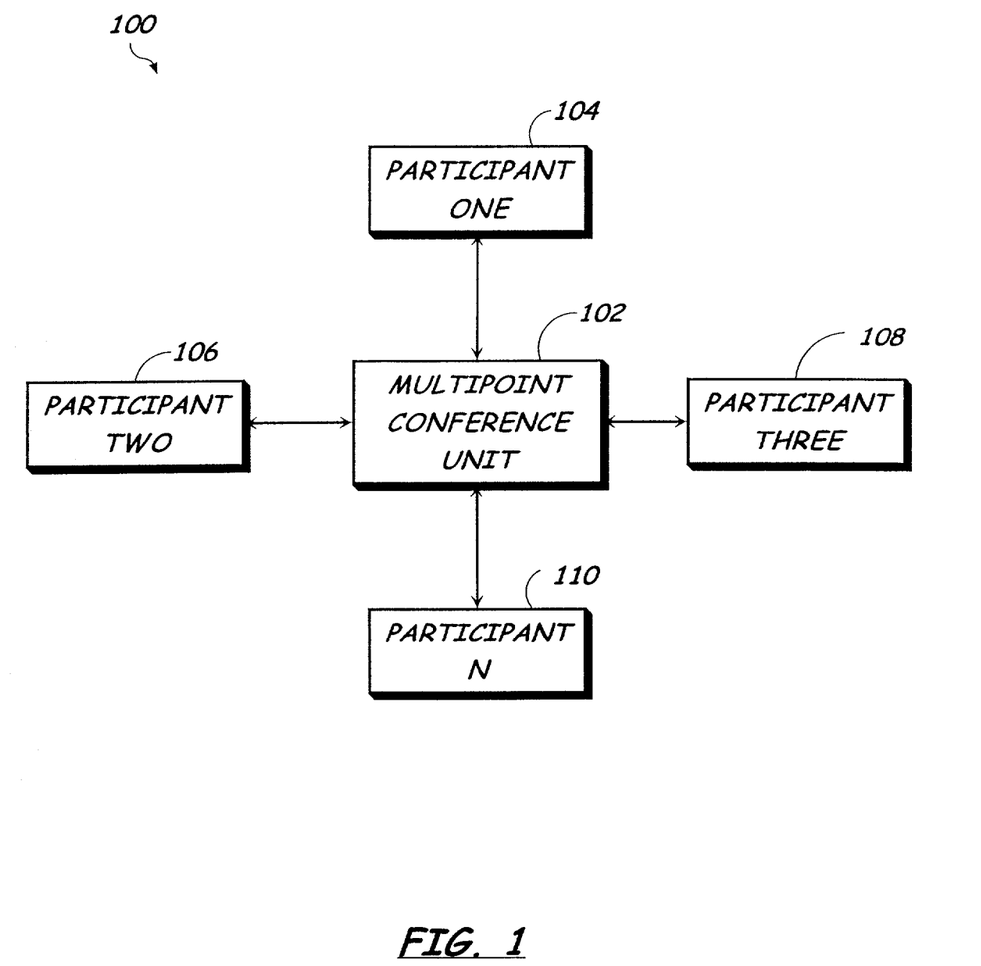
FIG. 1 is a block diagram depicting an embodiment of the present invention wherein a conference call system as utilized by a number of participants is shown.

Referring now to FIG. 1, an embodiment 100 of the present invention is shown wherein a conference call system as utilized by a number of participants is shown. A conference call system, which may be implemented as a multipoint control unit 102 (MCU) in an IP system, enables a plurality of participants to communicate in real time. Each participant may communicate over an input/output device communicatively coupled to the multipoint conference unit so as to enable the participants to interact over a conferencing session, such as through the use of voice and/or visual data. For instance, participant one 104, participant two 106, participant three 108 and up to participant N 110, located in different geographical regions, may participate by means of the multipoint conference unit 102.

During a conference calling session, background noise may be encountered from "silent" participants in which noise from participants' surroundings is received and transferred by the system, even if the participant is not communicating. This problem is magnified with each additional participant. However, by choosing a desired number of prominent inputs, such as the loudest input, clearest input, and the like, and providing those inputs to the participants, background noise and computational requirements may be reduced. Inputs may include voice packets utilized in a packetized data transfer system (such as a voice packet including voice recorded for a short period of time (e.g. 125 µs to 4 ms)), PCM, and the like as contemplated by a person of ordinary skill in the art.

For instance, input streams received as packets may be reconstructed inside the multipoint conference unit 102 to arrive as a continuous flow of voice. The prominent inputs may then be determined dynamically within a period of time, such as a few milliseconds. The output streams are the result of a combination of the prominent inputs, which may then be repacketized to be sent out on the networked system.

Figure 2:
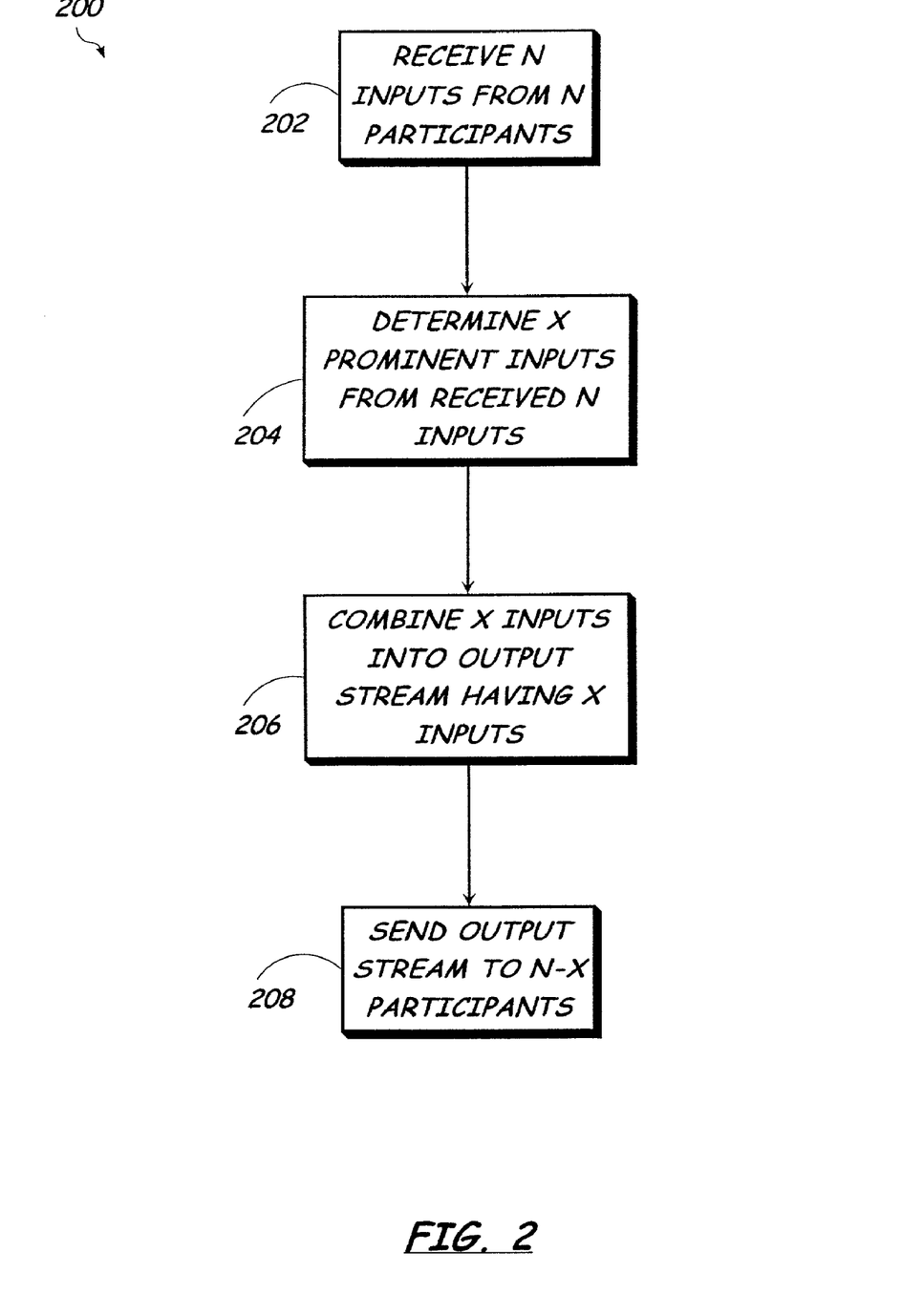
FIG. 2 is a flow diagram illustrating an exemplary method of the present invention wherein determined prominent inputs are combined and provided to participants in a conference call.

Referring now to FIG. 2, an exemplary method 200 of the present invention is shown wherein determined prominent inputs are combined and provided to participants in a conference call. Input streams, described as "N" inputs signifying the number of participants in a conference, are received 202. A number of prominent inputs are then determined from the received "N" inputs, which may include a number "X" representing a desired number of prominent inputs to be identified 204. Inputs may be classified as prominent based on loudness of input, such as signal strength, clarity of voice in the signal, clarity of signal overall, and the like as contemplated by a person of ordinary skill in the art.

The "X" inputs are then combined into an output stream 206. The output stream is then sent to the participants, and preferable only to the participants which did not originate the "X" inputs, such as the "N–X" participants 208. In this way, the output streams are provided to participants that will not encounter an echo upon receiving the stream. Additionally, an output stream will be provided to the X participants to receive output of other participants in the conference call.

Figure 3:
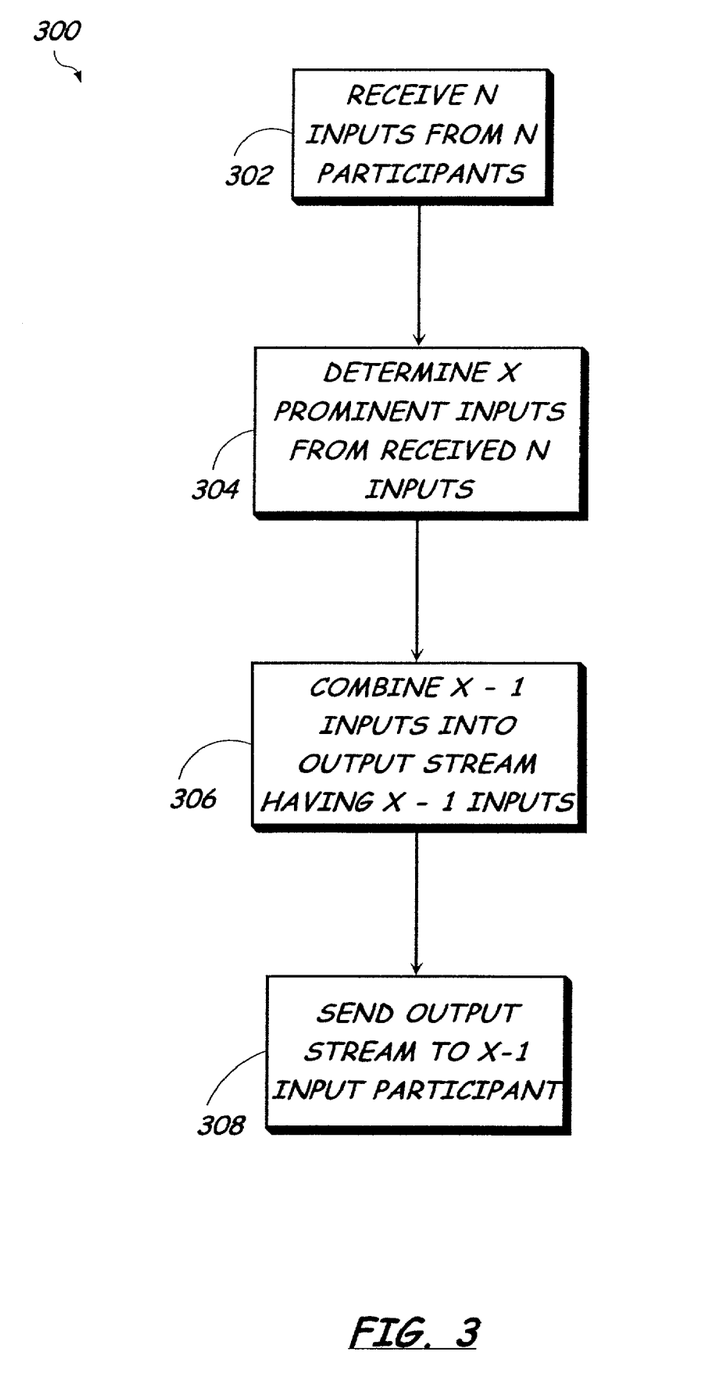
FIG. 3 is a flow diagram depicting an exemplary method of the present invention wherein determined prominent inputs are combined to provide an output stream without providing an echo and with reduced background noise.

For example, referring now to FIG. 3, an exemplary method 300 of the present invention is shown wherein determined prominent input streams are combined to provide an output stream without providing an echo and with reduced background noise. Input streams, such as "N," inputs described in FIG. 2, are received 302. Prominent inputs, "X," are then determined from the received "N" inputs 304.

For originating participants of the "X" inputs, an output stream is obtained by combining the other "X" inputs 306, in other words, the "X–1" inputs. The output stream having the "X–1" inputs is then sent to the "X" participant 308. Thus, a participant originating a prominent input receives an output stream including the other prominent outputs, thereby eliminating a possible echo effect due to packet transfer delay over a packetized system. The process may be performed for each "X" participant originating a prominent output so that a comprehensive conference experience is provided for each participant.

Figure 4:
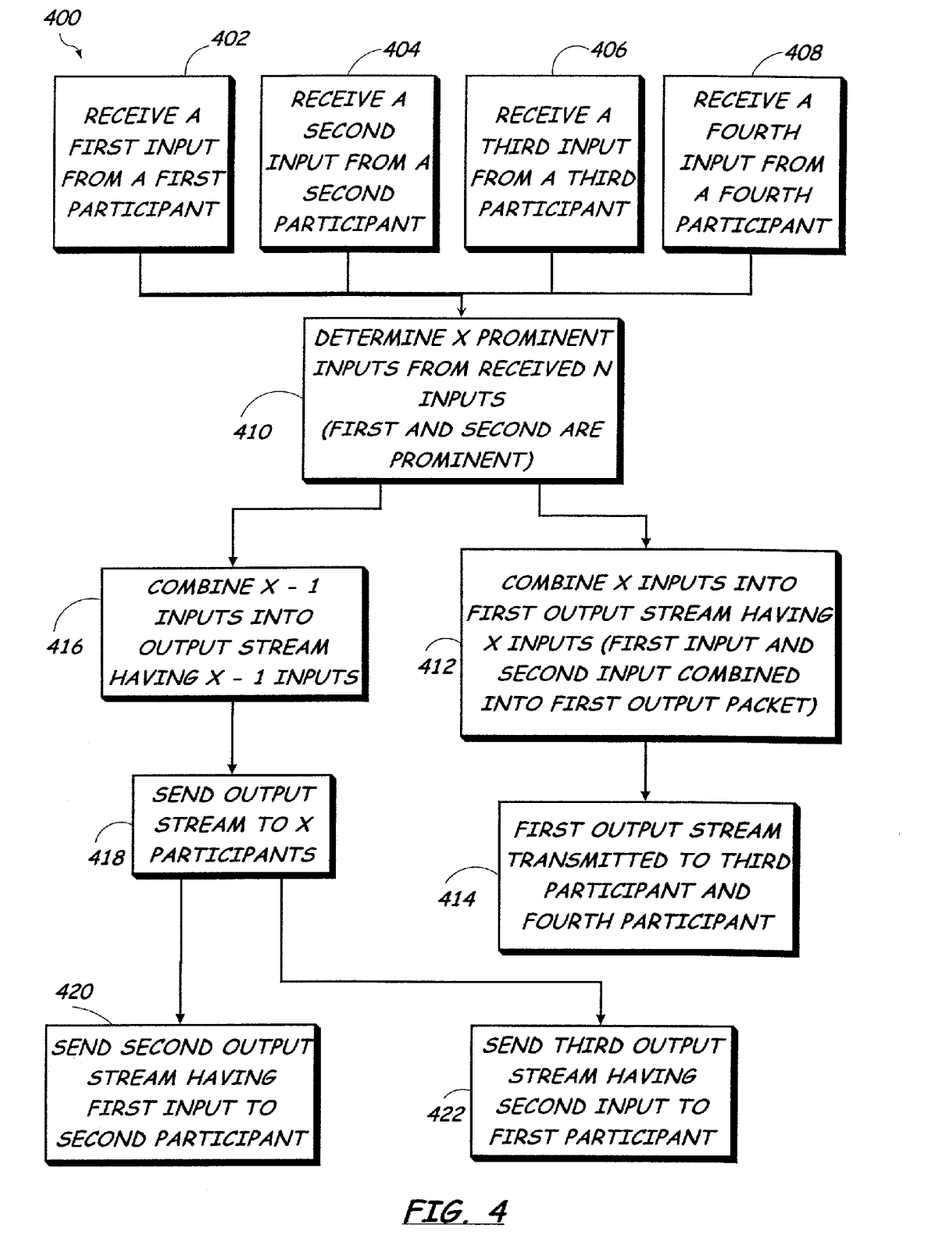
FIG. 4 is a flow diagram of an exemplary method of the present invention wherein a conferencing session involving a plurality of participants is provided with reduced background noise and computational requirements.

Referring now to FIG. 4, an exemplary embodiment 400 of the present invention is shown wherein a conferencing session involving a plurality of participants is provided with reduced background noise and computational requirements. Four participants are engaged in a conferencing session. A first input stream is received from a first participant 402, a second input stream is received from a second participant 404, a third input stream is received from a third participant 406 and a fourth input stream is received from a fourth participant 408. "X" prominent inputs, in this instance "X" being pre-selected as two, are then determined from the received inputs 410, the two "X" inputs from the first participant and the second participant.

The "X" inputs are combined into a first output stream, in this instance; the first input and second input stream are combined into a first output stream 412. The first output stream is then transmitted to the third participant and the fourth participant 414. Thus, a single output stream may be utilized for all participants that did not originate a prominent input, thereby resulting in an efficient use of computational resources. In this way, an improved conferencing session is achieved, by enabling larger groups of participants to be involved in a conferencing session without decreasing the quality of the conferencing session.

For participants originating the determined prominent inputs, output streams are formed for each originating participant which do not include the participant's input, i.e. "X–1" output stream 416, and sent to the respective "X" participants 418. For example, a second output stream is formed having the second input and sent to the first participant 420. Likewise, a third output stream is formed having the second input and is sent to the first participant 422. In this way, each participant of the conferencing session receives data without encountering an echo, with reduced background noise and with efficient use of computational resources.

The output streams provided to each of the participants in the present embodiment are summarized in the following table. As the first participant and the second participant originated the prominent inputs, the first participant receives an output stream having input from the second participant, and likewise, the second participant receives an output stream having an input from the first participant. The third and fourth participants receive an output stream having the prominent inputs from both the first participant and the second participant.

|  | Output to First Participant | Output to Second Participant | Output to Third Participant | Output to Fourth Participant |
| --- | --- | --- | --- | --- |
| Input One |  | X | X | X |
| Input Two | X |  | X | X |
| Input Three |  |  |  |  |
| Input Four |  |  |  |  |

Although two prominent inputs, "X," were described as a pre-selected number of input in the previous example, a wide range of prominent inputs are contemplated by the present invention without departing from the spirit and scope thereof. For example, as shown in the following table, three prominent inputs, "X," may be selected to provide a conferencing session in accordance with the present invention. The determined prominent inputs are A, B and C, with N representing additional participants in the conferencing session. Thus, in a voice conferencing session, each participant would hear the following inputs. As described above, participants originating prominent inputs receive output streams from the system that do not include their respective inputs. For instance, participant A receives an output stream resulting of the mixing of the input streams from participants B and C, participant B receives an output stream resulting of the mixing of the input streams from participants A and C, and likewise, participant C receives an output stream resulting of the mixing of the input streams from participants A and B. For the "N" participants, an output stream resulting of the mixing of the prominent inputs A, B and C is provided.

|  | Output to A | Output to B | Output to C | Output to N |
| --- | --- | --- | --- | --- |
| Input A |  | X | X | X |
| Input B | X |  | X | X |
| Input C | X | X |  | X |
| Input N |  |  |  |  |

Additionally, the output streams provided to each participant may be dynamically determined. For example, referring now to FIG. 5, an exemplary method 500 of the present invention is shown wherein a number of inputs included in an output stream, provided to participants originating prominent inputs, includes a next prominent input. "N" inputs are received from "N" participants 502 and "X" prominent inputs are determined from the received inputs 504. For participants that did not originate a prominent input 506, the "X" inputs are combined into an output stream 508 and sent to the "N−X" participants 510.

Figure 5:
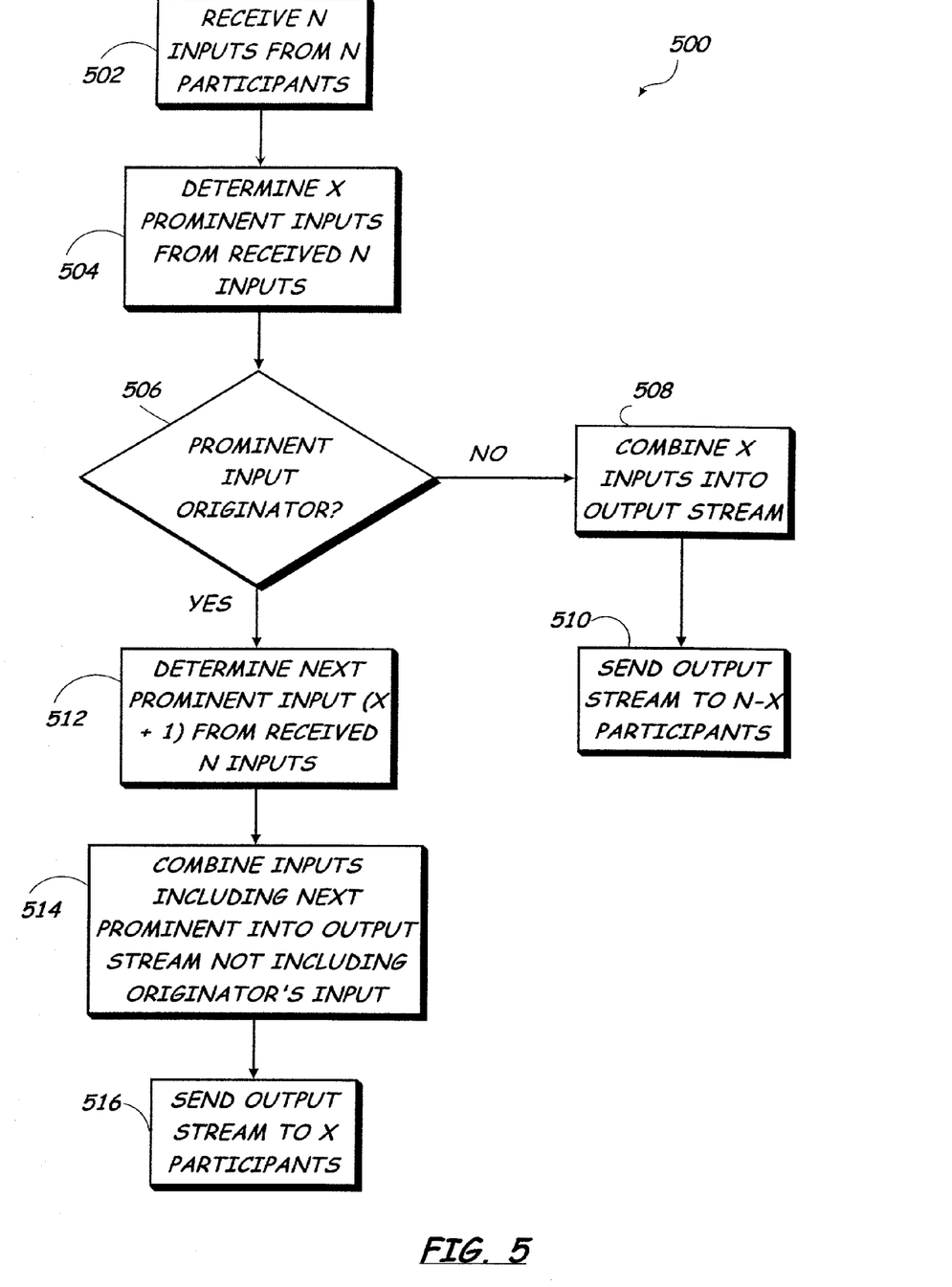
FIG. 5 is a flow diagram illustrating an exemplary method of the present invention wherein a number of inputs included in an output stream provided to participants originating prominent inputs includes a next prominent input.

For participants that did originate a prominent input 506, a next prominent input, i.e. "X+1," input is determined from the received N inputs 512. For instance, a next prominent input may include the next loudest input, next clearest input, and the like as contemplated by a person of ordinary skill in the art. Further, the prominent characteristic may be different from the characteristic utilized to determine the initial "X" prominent inputs without departing from the spirit and scope of the present invention. For example, the "X" prominent inputs may be determined by signal clarity, and the next most prominent input may be determined by strength of signal.

The next most prominent input is then combined with other prominent inputs into an output stream, which does not include the respective originator's input. Output streams configured for each prominent-input-originating participant are the sent to the "X" participants 516. Thus, participants of a conference call that originate a prominent input may receive an increased number of inputs from other participants in the conferencing session.

The following table further describes the embodiment described in relation to FIG. 5. Three prominent inputs, "X" are initially selected to provide a conferencing session in accordance with the present invention. The determined prominent inputs are A, B and C, with D and N representing additional participants in the conferencing session. As described above, participants originating prominent inputs receive output streams from the system that do not include their respective inputs. Further, originating participants receive the next most prominent input. For instance, participant A receives an output stream including input streams from participants B, C and D, participant B receives an output stream including input streams from participants A, C and D, and likewise, participant C receives an output stream including input streams from participants A, B and D. For "N" participants and "D" participant, an output stream including the prominent inputs A, B and C is provided.

|         | Output to A | Output to B | Output to C | Output to N & D |
|---------|-------------|-------------|-------------|-----------------|
| Input A |             | X           | X           | X               |
| Input B | X           |             | X           | X               |
| Input C | X           | X           |             | X               |
| Input D | X           | X           | X           |                 |
| Input N |             |             |             |                 |

Figure 6:
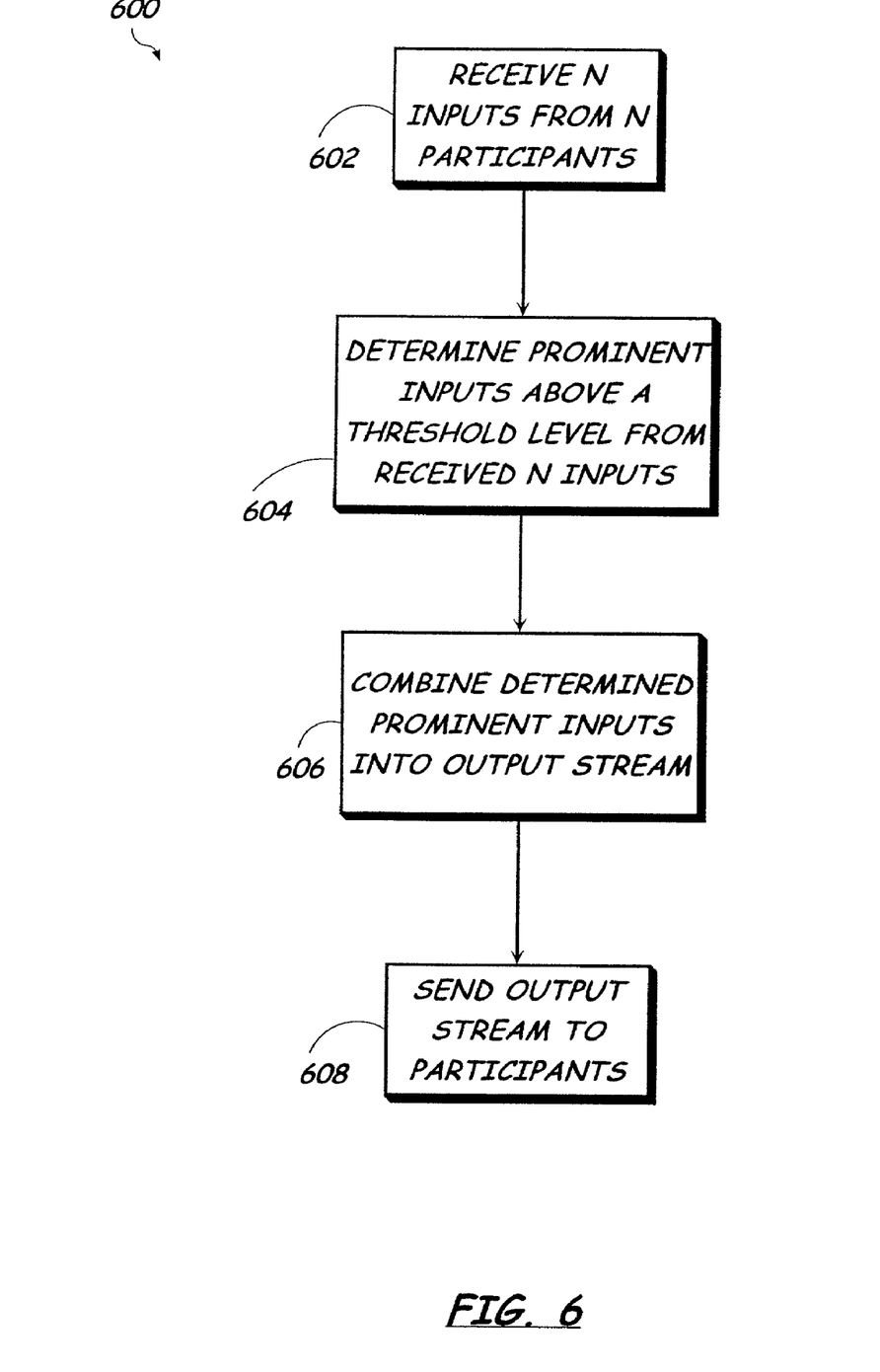
FIG. 6 is a flow diagram depicting an exemplary method of the present invention wherein a number of prominent inputs is determined based upon a threshold level of a desired characteristic.

Referring now to FIG. 6, an exemplary method 600 of the present invention is shown wherein a number of prominent inputs is determined based upon a threshold level. In some instances, it may be desirable to determine if an input is above a threshold level before combining the input into an output stream. For instance, in an "X" determined number of prominent inputs, one of the "X" inputs may be below a volume level indicating that the input is merely background noise, may lack sufficient clarity, and the like. Combining such an input lacking the desired characteristic may result in degradation of the quality of the conferencing session. However, by utilizing the present method, such an input would not be combined, and therefore, would not degrade the conferencing session.

For example, "N" inputs may be received from "N" participants in a conferencing session 602. Prominent inputs are determined from inputs above a threshold characteristic level from the "N" inputs 604. For example, although "X" may be three, only two of the three most prominent inputs correspond to a desired characteristic threshold, such as loudness, signal clarity, and the like. The determined prominent inputs having the desired characteristics are then combined into an output stream 606, and the output stream is sent to participants 608. It should be apparent that this method may be combined with any of the previous methods described so that a number of inputs, dynamically determined based upon a number above a desired threshold characteristic, are combined to provide an improved conferencing session without departing from the spirit and scope of the present invention.

Outputs may also be combined into a packet including sub-packets for efficient transport over a network. For example, referring now to FIG. 7, an exemplary method 700 of the present invention is shown wherein a packet including at least two sub-packets is formed for efficient network transport. A conference including "N" participants is initiated. A conferencing system controller, such as a multipoint conferencing unit, receives "N" inputs from "N" participants 702. The "X" prominent inputs from the received "N" inputs are determined 704.

Figure 7:
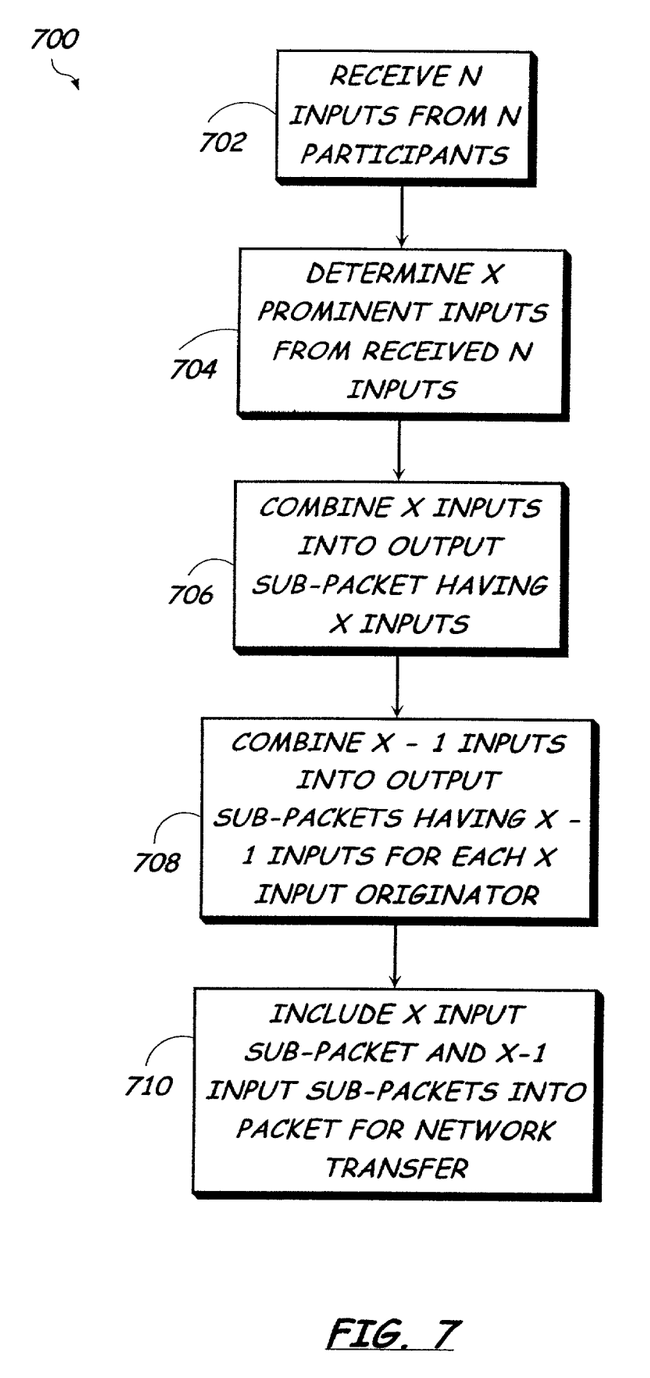
FIG. 7 is a flow diagram of an exemplary method of the present invention wherein inputs received from participants are combined into an output packet including sub-packets.

The "X" inputs are combined into an output sub-packet having "X" inputs 706, such as by mixing the inputs to form a single combined packet and the like as contemplated by a person of ordinary skill in the art. Additionally, the "X−1" inputs are combined into output sub-packets having "X−1" inputs for each "X" input originator 708. The "X" input sub-packet is included with the "X−1" sub-packets into an output packet for network transfer 710. In this way, a single packet may be provided which includes the sub-packets needed for output by each of the endpoints of the conferencing system.

Thus, the present invention significantly reduces the number of packets sent over the network and consequently offloads the protocol stack of a multipoint control unit. Whatever the number of people participating in the conference, the number of packets sent by the MCU is low and constant per conference because it is determined by the number of prominent speakers chosen for mixing. In the case that the participants use a low-bit rate voice codec, such as G723.1, the computing power needed by the MCU to encode the mixed voice stream is further reduced, since only a minimal number of output voice streams need to be encoded.

The present invention may be implemented in a variety of systems. For instance, as shown in the exemplary method 800 depicted in FIG. 8, a conference call of "N" participants may utilize a multipoint control unit (MCU) which utilizes the "X" number of prominent inputs, such as the three loudest. In contemplated embodiments, during setup of a conferencing session, a multicast IP address and user datagram protocol (UDP) port may be negotiated 802. Thus, each participant in the conference may send its voice stream to the IP address of the MCU, whereas the MCU sends its output to this multicast IP address.

Figure 8:
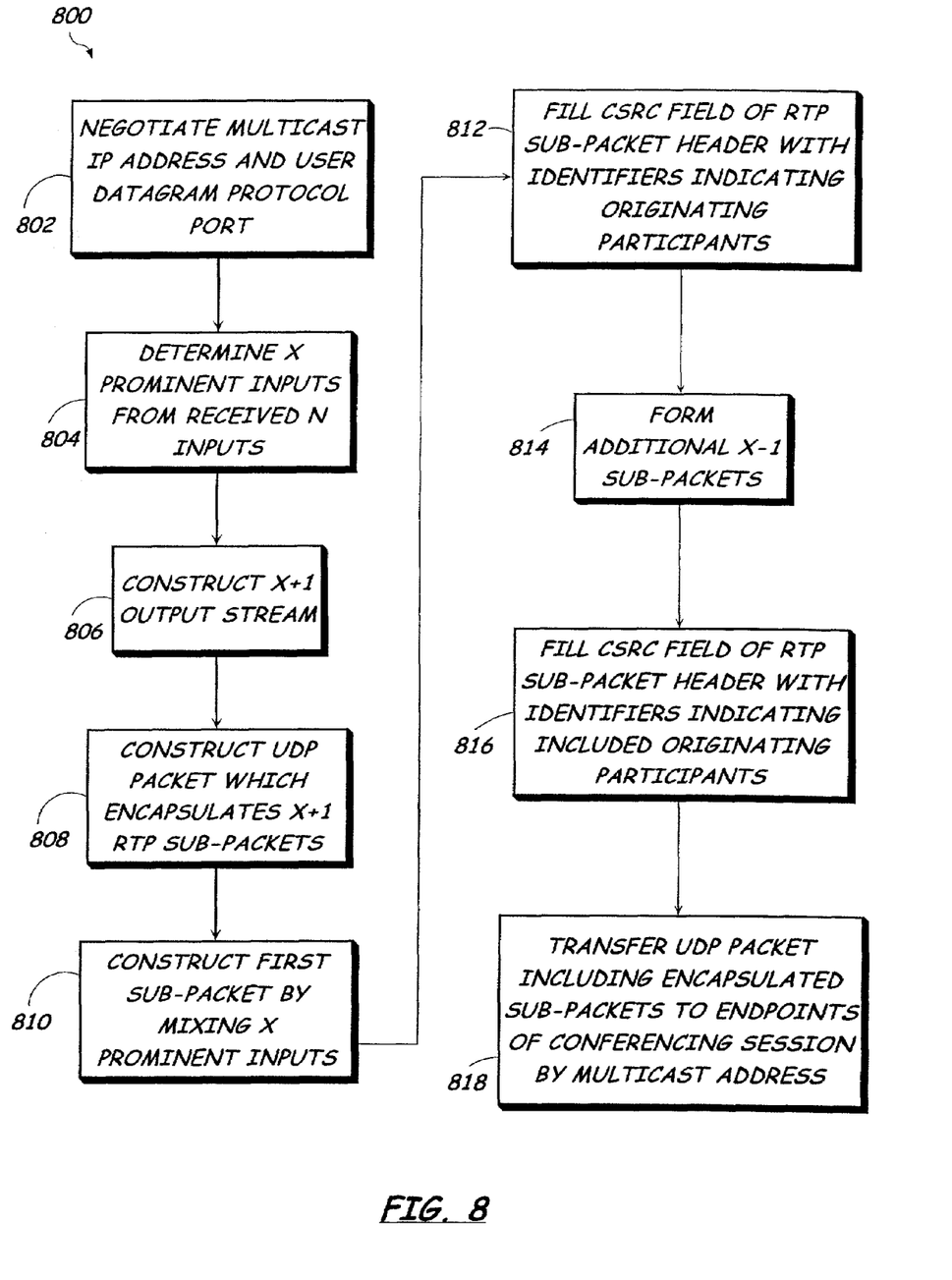
FIG. 8 is a flow diagram illustrating an exemplary method of the present invention wherein received inputs are combined into a UDP packet encapsulating RTP sub-packets.

Periodically during the conference, such as every 20 to 30 ms, "X" prominent participants are selected 804 and an "X+1" output stream is constructed 806. From the output streams, a UDP packet is constructed 808 which encapsulates "X+1" RTP sub-packets. The first RTP sub-packet is formed by mixing all of the prominent participants as previously described 810. A field titled "contributing sources" (CSRC) of the RTP header is filled with identifiers indicating the originating participants of the prominent inputs 812. A synchronization source (SSRC) field is filled with an identifier of the multipoint control unit 814. The other sub-packets are formed by mixing the prominent inputs minus one prominent input. The field CSRC of the RTP header is filled accordingly with identifiers indicating the prominent participants mixed in this packet 816. A timestamp field may also be provided in each RTP sub-packet with the same timing information. Then, the combined packet, including the sub-packets, is sent to the endpoints for output to a user by utilizing a multicast address 818.

Figure 9:
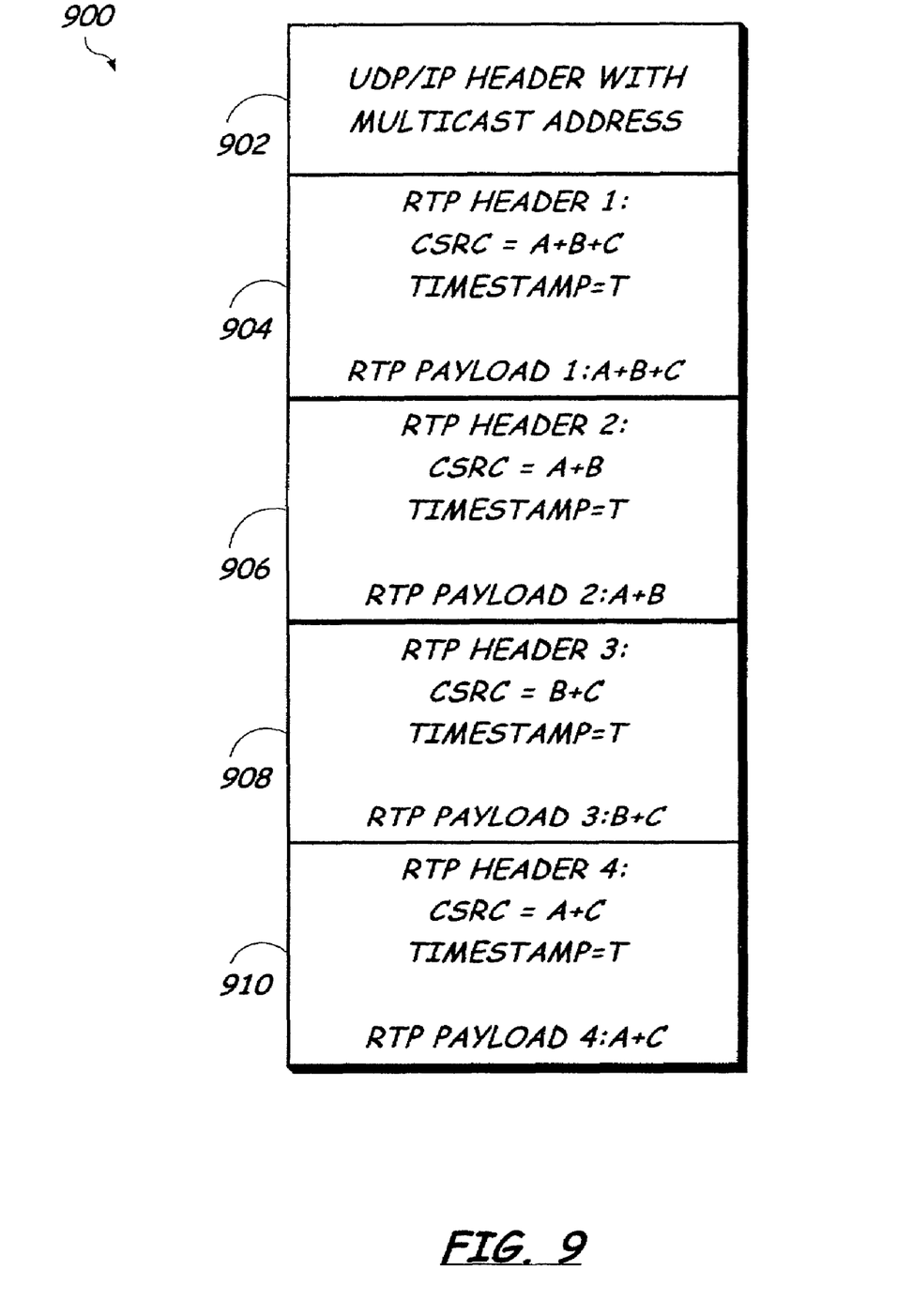
FIG. 9 is a block diagram depicting an exemplary embodiment of the present invention wherein a UDP packet including a plurality of RTP subpackets is configured for efficient network transport and endpoint processing to determine relevant sub-packet payload for output.

Referring now to FIG. 9, an exemplary embodiment 900 of the present invention is shown wherein a packet includes sub-packets for efficient network transport. As discussed with relation to FIG. 8, a conferencing session may be provided with N participants, of which, A, B and C are the participants originating "X" prominent inputs, in this instance three, and "N−3" are the rest of the participants. A packet 902 including sub-packets includes four sub-packets and a packet header, which may include a multicast address.

The first sub-packet 904 includes a header indicating the originating inputs of that packet, in this instance endpoints A, B & C, and includes a payload of the combined inputs received from endpoints A, B & C. The second sub-packet 906 includes a header indicating the originating inputs of this packet, A & B, and a corresponding payload of the inputs received from endpoints A & B. Likewise, the third sub-packet 908 includes a header indicating the originating inputs of this packet, B & C, and a corresponding payload of the inputs received from endpoints B & C. The fourth sub-packet 910 includes a header indicating the originating inputs of this packet, A & C, and a corresponding payload of the inputs received from endpoints A & C. Thus, a single packet may be formed for transport to each of the endpoints, thereby reducing computational requirements and network bandwidth requirements.

Therefore, the "N−3" participants will output the RTP payload of sub-packet one 904, endpoint A will output the RTP payload of packet three 908, endpoint B will output the RTP payload of packet four 910 and endpoint C will output the RTP payload of packet two 906. Packets may continue to be constructed and reevaluated for the most prominent inputs. Thus, the present invention may utilize the multicast feature of the IP protocol and the contributing sources feature of the RTP protocol in accordance with the present invention to significantly reduce the number of packets transmitted over a network.

Additionally, it may be preferable to format the packet so that each endpoint may then output the first RTP packet which does not contain the endpoint's identifier in the contributing sources field of the RTP header. For instance, referring again to FIG. 9, the packet 902 may be configured so that its first sub-packet includes the prominent inputs, while each successive sub-packet does not include all of the prominent inputs. Thus, when an endpoint receives a packet, the endpoint may examine the header of the first sub-packet and if that endpoint is not indicated in the first sub-packet, i.e. the endpoint is one of the "N−X" endpoints, the endpoint may output that sub-packet.

However, if the endpoint is indicated, i.e. the endpoint is an originator of a prominent input, the endpoint may continue to examine the sub-packets until a sub-packet is reached that does not include the input. In this way, endpoints may quickly determine the correct sub-packet to output, without causing each of prominent input originators to encounter an echo from packet transfer delay.

Additionally, in an instance wherein participants utilize different voice codecs, such as G711, G723.1, and the like, several multicast addresses may be provided, one for each codec used without departing from the spirit and scope of the present invention.

Although the invention has been described with a certain degree of particularity, it should be recognized that elements thereof may be altered by persons skilled in the art without departing from the scope and spirit of the invention. It is understood that the specific orders or hierarchies of steps in the methods illustrated are examples of exemplary approaches. Based upon design preferences, it is understood that the specific orders or hierarchies of these methods can be rearranged while remaining within the scope of the present invention. The accompanying method claims present elements of the various steps of methods in a sample order, and are not meant to be limited to the specific order or hierarchy presented.

It is believed that the scope of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for providing a conferencing session, comprising:
    receiving inputs from a number of participants in a conferencing session;
        determining a number of prominent inputs from the received inputs, the inputs being determined as prominent based upon voice clarity and voice loudness;
        combining prominent inputs into an output packet including a first sub-packet and a second sub-packet, wherein the first sub-packet has a first payload and the second sub-packet has a second payload, the first payload and the second payload including inputs combined from at least a portion of the received inputs from the number of participants, wherein the first payload includes at least one received input that is not included in the second sub-packet; and
        configuring the sub-packets in the output packet so that upon receipt of the output packet by a participant, the participant examines the packets and output a first examined sub-packet which does not include an indication that the sub-packet includes content received from the participant, the output packet being configured as a UDP packet which encapsulates the first sub-packet and the second sub-packet, the first sub-packet and the second sub-packet configured as RTP packets.

2. The method as described in claim 1, wherein the determined prominent inputs are utilized to provide the first payload for the first sub-packet and the second payload for the second sub-packet.

3. The method as described in claim 2, wherein inputs are determined as prominent based upon a characteristic including at least one of signal strength and prominence history.

4. The method as described in claim 1, wherein the second sub-packet includes at least one received input that is not included in the first sub-packet, wherein the at least one received input that is not included in the first sub-packet includes a next most prominent received input.

5. The method as described in claim 1, wherein the first sub-packet and the second sub-packet include headers indicating originating participants of the first payload and the second payload.

6. The method as described in claim 1, further comprising transmitting the output packet to at least a portion of the number of participants in the conferencing session utilizing a multicast IP address.

7. A method for providing a conferencing session, comprising:
   receiving inputs from a number of participants in a conferencing session;
      determining a number of prominent inputs from the received inputs, the inputs being determined as prominent based upon voice clarity and voice loudness;
      combining prominent inputs into an output packet including at least two sub-packets, the sub-packets having payloads including mixed received inputs from the number of participants, wherein the payloads of at least two of the sub-packets contain different mixed received inputs; and
      configuring the sub-packets in the output packet so that upon receipt of the output packet by a participant, the participant examines the packets and outputs a first examined sub-packet which does not include an indication that the sub-packet includes content received from the participant, the output packet being configured as a UDP packet which encapsulates the first sub-packet and the second sub-packet the first sub-packet and the second sub-packet configured as RTP packets.

8. The method as described in claim 7, wherein the determined prominent inputs are utilized to provide the payloads for the sub-packets.

9. The method as described in claim 8, wherein inputs are determined as prominent based upon a characteristic including at least one of signal strength and prominence history.

10. The method as described in claim 7, wherein the sub-packets include headers indicating originating participants of the first payload and the second payload.

11. The method as described in claim 10, wherein the headers are contributing sources (CSRC) headers.

12. The method as described in claim 7, further comprising transmitting the output packet to at least a portion of the number of participants in the conferencing session utilizing a multicast IP address.

13. A conferencing system suitable for providing a conferencing session to a plurality of participants, comprising:
   a multipoint conferencing unit communicatively coupled over a packetized connection to a plurality of input/output devices as utilized by a number of participants so as to enable the participants of a conferencing session to interact, wherein the multipoint conferencing unit is configured to
      receive inputs from the input/output devices in a conferencing session;
      determine a number of prominent inputs from the received inputs, the inputs being determined as prominent based upon voice clarity and voice loudness;
      combine prominent inputs into an output packet including a first sub-packet and a second sub-packet, wherein the first sub-packet has a first payload and the second sub-packet has a second payload, the first payload and the second payload including inputs combined from at least a portion of the received inputs from the number of participant, wherein the first payload includes at least one received input that is not included in the second sub-packet; and
      configure the sub-packets in the output packet so that upon receipt of the output packet by a participant, the participant examines the packets and outputs a first examined sub-packet which does not include an indication that the sub-packet includes content received from the participant, the output packet being configured as a UDP packet which encapsulates the first sub-packet and the second sub-packet, the first sub-packet and the second sub-packet configured as RTP packets.

14. The conferencing system as described in claim 13, wherein the determined prominent inputs are utilized to provide the first payload for die first sub-packet and the second payload for the second sub-packet.

15. The conferencing system as described in claim 14, wherein inputs are determined as prominent based upon a characteristic including at least one of signal strength and prominence history.

16. The conferencing system as described in claim 13, wherein the second sub-packet includes at least one received input that is not included in the first sub-packet, wherein the at least one received input that is not included in the first sub-packet includes a next most prominent received input.

17. The conferencing system as described in claim 13, wherein the first sub-packet and the second sub-packet include headers indicating originating participants of the first payload and the second payload.

18. The conferencing system as described in claim 13, wherein the multipoint conferencing system further transmits the output packet to at least a portion of the number of participants in the conferencing session utilizing a multicast IP address.

* * * * *